United States Patent Office 3,207,794
Patented Sept. 21, 1965

3,207,794
NOVEL PROCESS FOR ALKYLATED BISPHENOLS
Paul G. Haines and Harry E. Albert, Lafayette Hill, Pa., assignors to Pennsalt Chemicals Corporation, Philadelphia, Pa., a corporation of Pennsylvania
No Drawing. Filed Mar. 22, 1961, Ser. No. 97,441
5 Claims. (Cl. 260—619)

This invention relates to a novel process for the preparation of alkylated bisphenols and is particularly concerned with an azeotropic distillation step prior to alkylation.

It is known to manufacture bisphonolic-type antioxidants by first condensing an aldehyde with phenol or a substituted phenol containing one or more lower alkyl groups (e.g., cresols, xylenols, etc.) and subsequently alkylating the phenol-aldehyde condensate (e.g., the bisphenol) with an olefin to obtain the alkylated bisphenolic antioxidant. Such processes are disclosed in U.S. 2,734,088.

In such prior art processes the alkylation step must be carried out under anhydrous conditions and thus it is necessary to remove the water formed during the phenol-aldehyde condenstion. Heretofore this dehydration step was accomplished by conventional distillation with vacuum distillation being used near the end of the dehydration process. After this dehydration the usual alkylation catalysts were added and the alkylation then carried out by adding the desired olefins and maintaining conventional alkylation conditions to complete the process.

It has now been found that if instead of carrying out the dehydration step in the usual manner, this step is replaced by the novel process of this invention, not only are the process steps simplified, but, surprisingly, a higher yield of alkylated bisphenol is obtained. The present invention comprises continuously removing the water formed during the condensation of the phenol with an aldehyde by adding to the reaction mass to form an azeotrope with the water, the olefin to be used for the alkylation, and then azeotropically distilling the water-olefin azeotrope from the reaction mass. As the azeotropic distillation proceeds, the distillate is separated into olefin and water layers and the olefin layer is preferably removed and returned to the reaction mass. When all of the water is removed, an alkylation catalyst (such as sulfuric acid, BF$_3$, etc.) is added and the alkylation carried out in the conventional manner.

To obtain rubber antioxidants by the process of this invention the phenolic materials employed will be those having not more than two alkyl substituents per phenol nucleus, which substituents have a total of not more than 3 carbon atoms. These phenols may be represented by the general formula:

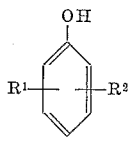

where R$^1$ and R$^2$ may be hydrogen or methyl or ethyl radicals and may be the same or different, the total number of carbon atoms in R$^1$ and R$^2$ combined being not greater than 3. Suitable phenolic starting materials thus include unsubstituted phenol, C$_6$H$_5$OH; cresols including ortho-, meta- and para-cresols and mixtures of cresols; xylenols, including 2,3-xylenol, 2,4-xylenol, 2,5-xylenol, and 2,6-xylenol or mixtures of these. Ethylphenols including ortho-, meta- and para-ethylphenol may also be employed although they are not preferred. Highly preferred is phenol and mixtures of phenol and cresols. Antioxidants prepared in accordance with the invention from phenol are of especially high activity and the procedures of the invention are particularly applicable to such mixtures. Also preferred are the cresols, particularly mixtures such as mixtures of meta- and para-cresol, or mixtures of cresols with xylenols. Such starting materials likewise lend themselves particularly well to the procedures of the invention and produce excellent antioxidants.

The aldehyde suitable for use in the condensation step include aldehydes having from 1 to 9 carbon atoms and preferably from 2 to 5 carbon atoms, aliphatic aldehydes containing only carbon, hydrogen and oxygen being preferred. Particularly preferred aldehydes include glyoxal, acetaldehyde (or paraldehyde), propionaldeyhde, n-butyraldehyde, isobutyraldehyde, n-valeraldehyde and isovaleraldehyde. Other aldehydes that may be employed include, e.g. formaldehyde, benzaldehyde, p-chlorobenzaldehyde, salicylaldehyde, chloroacetaldehyde, β-chloropropionaldehyde, crotonaldehyde, acrolein, glutaraldehyde, 2-ethylhexaldehyde, chloral and aldol.

The condensation of the phenols with the aldehyde is carried out by adding the aldehyde together with a condensation catalyst. The condensation conditions should be adjusted so that the predominant products of the condensation are bisphenols with only minor amounts (e.g., 2 to 5%) of higher condensation products such as tris and tetrakis phenols. Under proper conditions essentially no resinous material is produced; e.g., products whose molecules contain more than about 4 phenol nuclei. Such resinous materials are unsuitable in that they have little or no antioxidant activity. When a polyfunctional aldehyde is used such as glyoxal two moles of phenolic material may condense with each aldehyde group (e.g. four moles of phenolic may condense with one mole of glyoxal). With reference to such polyfunctional aldehydes, the term bisphenol is intended to mean condensates containing per molecule no more than two phenolic nuclei per aldehyde group of the aldehyde. For example, a bisphenol with reference to glyoxal would mean one containing four phenolic nuclei per molecule.

Control of the condensation reaction to produce predominantly bisphenols and little or no resinous material depends in large measure upon controlling the molar ratio of aldehyde to phenolic material capable of undergoing the condensation reaction. Usually, the molar ratio of monofunctional aldehyde to condensable phenolic material should be of the order of 0.5, this being the stoichiometric ratio to produce bisphenols, although some departure from this ratio, e.g. ratios of from about 0.3 to about 1.5, may be used. The criticality of the aldehyde to phenol ratio will vary depending on the aldehyde employed and the degree to which the phenolic material is substituted with alkyl groups thus blocking potentially reactive positions. If formaldehyde is used, care must be exercised since formaldehyde is very reactive relative to other aldehydes and readily tends to form resinous materials. The more substituted the phenolic material the less critical is the aldehyde:phenol ratio, or the other condensation conditions, since there are fewer reactive positions on the phenol to react with the aldehyde. Some excess of aldehyde over the theoretical amount to form bisphenols is often desirable to assure complete conversion of condensable phenols particularly since some of the aldehyde may be consumed by side reactions such as aldehyde condensing with itself.

Reaction temperature for the condensation reaction will usually be between 20° C. and 100° C. Lower temperatures, e.g. 20° C. to 40° C. are favored for formaldehyde because of the reactivity of this aldehyde, while with less reactive aldehydes such as propionaldehyde and isobutyraldehyde reaction temperatures of from 40° to 80° C. are generally preferred.

The condensation reaction is preferably carried out in the presence of an acidic type catalyst. Sulfuric, phosphoric, p-toluenesulfonic or acetic acids are to be preferred.

Reaction time is not critical, and usually is of the order of from 1 to 5 hours.

A mole of water is formed for each mole of aldehyde that reacts and in accord with this invention this water of reaction is removed by an azeotropic distillation. For this purpose there is added to the bisphenols formed as described above the liquid olefin to be used for alkylation.

Preferred among the olefins are the alkenes such as amylenes, hexenes, heptenes, octenes and nonenes. Such olefins are available as by-products of petroleum refinery operations such as from the catalytic cracking of gas oil; by the polymerization of propylene to produce isomeric hexenes or nonenes; by the polymerization of isobutylene to produce isomeric octenes and from other similar relatively inexpensive sources. Particularly preferred are tertiary alkenes (i.e. those containing a tertiary carbon atom) having from 5 to 9 carbon atoms such as diisobutylene (which is a mixture of the isomers 2,4,4-trimethyl-pentene-2 and 2,4,4-trimethyl-pentene-1 produced by the dimerization of isobutylene) and the olefins 2-methyl butene-1, and 2-methyl butene-2. Commercial olefin mixtures, such as mixed amylenes, mixed hexenes, mixed heptenes, mixed octenes or mixed nonenes are desirable because of their relatively low cost. Other olefins that may be employed include cycloalkenes such as cyclohexene, α-methylcyclohexene, cyclopentene, α-methylcyclopentene, 4-methylcyclohexene, etc. and aralkenes such as styrene, α-methylstyrene, 4-methylstyrene, 4-ethylstyrene, 3-chlorostyrene, 2-methylstyrene, etc. The above olefins form an azeotrope with the water and the azeotrope is distilled from the reaction vessel by conventional methods. In a preferred technique, the distillate is received in a settling or hold tank equipped with an overflow device whereby the liquid distillate separates into a bottom aqueous layer and a top organic layer and the organic layer is recirculated to the phenol-aldehyde reaction mass. This is advantageous because the organic layer contains unreacted aldehyde, which on being returned to the reaction mass reacts with any free phenol to give increased yields of products.

After the distillation procedure has removed all of the water from the aldehyde reaction mass the distillation is stopped and an alkylation catalyst added. The alkylation is carried out in the presence of Friedel-Crafts type catalysts; e.g. sulfuric acid, hydrochloric acid, p-toluenesulfonic acid, $AlCl_3$, $ZnCl_2$, $SnCl_4$, $H_3PO_4$, $BF_3$, etc. Other alkylation reaction conditions include: anhydrous reaction media; temperatures ranging from 20 to 120° C. and preferably from 20 to 80° C.; pressures ranging from atmospheric to 1000 lbs./in.$^2$ gage or more and preferably from atmospheric to 60 lbs./in.$^2$ gage; and reaction periods of from 1 to 8 hours. The molar ratio of olefin to phenolic material should generally be in the range of from 3 to 1 to 1 to 1 depending upon the potentially available alkylatable positions on the nucleus of the phenolic starting material.

After the alkylation is complete, the acid reaction mass is neutralized and the crude product stripped of volatile material by distillation in a conventional manner, preferably with use of vacuum or steam. The still pot residue is then filtered to remove inorganic salts and the filtrate is a viscous oil which is the antioxidant product ready for use.

The final product obtained by the above procedures is a complex mixture, but useful and very effective as a rubber antioxidant. In a preferred procedure which yields a preferred antioxidant two moles of phenol and one of isobutyraldehyde are condensed and this product reaction mass azeotropically distilled using diisobutylene and then the alkylation carried out. The product thus obtained consists predominantly of a bisphenol of the structure

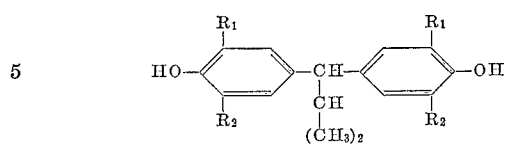

where $R_1$ and $R_2$ are H or tertiary octyl and at least one R group is a tertiary octyl group.

In order to further describe the invention the following examples are given:

*Example 1.—Azeotropic distillation*

A mixture of 188 g. (2.0 moles) phenol, 72 g. (1.0 mole) of isobutyraldehyde and 10 ml. of 40% sulfuric acid was stirred under reflux at 60–70° C. for 2 hours to prepare a bisphenol product. Then, 448 g. (4 moles) diisobutylene was added and the mixture was refluxed with a separator type reflux head so that the top layer of condensate was continuously returned to the still pot and the lower layer (water) was drawn off from time to time and discarded. A total of 28.5 ml. of water collected and was separated. After allowing the still pot contents to cool slightly, 11.3 g. of concentrated sulfuric acid was added dropwise as alkylation catalyst. The mixture was stirred for 2 hours at 65–75° C. The catalyst was neutralized by addition of 20 g. anhydrous sodium carbonate and the crude product was stripped of volatile material to 130° C. at 20 mm. pressure. The hot still pot residue was filtered to remove inorganic salts to give 599 g. viscous oil antioxidant product.

When the above procedure is repeated except that a small fraction of the diisobutylene required for the alkylation is used for the azeotropic distillation and the balance is added after addition of catalyst for the alkylation, the same results are achieved. This procedure has the advantage of minimizing any temperature surge that is sometimes obtained when catalyst is added for the alkylation step.

*Example 2.—No azeotropic distillation*

Example 1 was repeated except that the water of condensation from the reaction of phenol and isobutyraldehyde was distilled conventionally at 90° C. and 80 mm. Hg pressure. The still pot residue after alkylation, neutralization, stripping of volatiles, and filtration was 454 g. of product. Thus, by use of the azeotropic process of Example 1 a 32% higher yield was obtained.

*Example 3*

Example 1 was repeated except that 85% phosphoric acid (12 g.) was used as the alkylation catalyst. The final filtered product weighed 606 g.

*Example 4*

A mixture of 188 g. (2.0 moles) phenol, 72 g. (1.0 mole) of isobutyraldehyde and 5 g. of p-toluenesulfonic acid monohydrate was stirred under reflux at 60–70° C. for 2 hours. 448 g. (4 moles) of diisobutylene was added and the mixture was refluxed with a water separator type reflux head as in Example 1. A total of 19.8 ml. of water layer was collected and separated. After allowing the reaction mixture to cool slightly, 11.3 g. of concentrated sulfuric acid was added and the reaction was continued as in Example 1. The filtered, viscous oil product weighed 578 g.

*Example 5.—No azeotropic distillation*

A mixture of 72 g. (1.0 mole) isobutyraldehyde, 188 g. (2.0 moles) phenol and 5 g. concentrated hydrochloric acid was stirred for 3 hours at 40–50° C. The by-product water formed in the reaction was removed by distillation at 80 mm. pressure to a still pot temperature of 90° C. The distillate weighed 27.5 g. and contained an isobutyraldehyde layer weighing 6.5 g. The still pot residue weighed 234.7 g. To the dehydrated still pot residue was added 2 ml. of concentrated sulfuric acid and 448 g. (4.0 moles) of diisobutylene. The resulting reaction mixture was stirred for 3 hours at 40–50° C. After adding 10 g. anhydrous sodium carbonate to neutralize the acid present, the product was stripped of volatile material by distillation at 20 mm. pressure to 95° C. The hot still pot residue was filtered to remove the inorganic salts to give a filtrate of 449.5 g. brown colored viscous oil. Thus Examples 1, 3, and 4 where azeotropic distillation was used obtained higher yields of from 28.5% to 33%.

*Example 6*

When Example 1 is repeated except that a mixture of cresole is used for phenol, acetaldehyde is used for isobutyraldehyde and alkylation is carried out with a mixture of nonenes, the azeotropic distillation technique gives improved yields of 30% over conventional vacuum distillation.

It will be understood that the above description and examples are illustrative and numerous changes may be made without departing from the spirit and scope of the invention.

We claim:

1. In the process of preparing alkylated bisphenols by condensing an aldehyde with a phenol at a temperature between 20° and 100° C. and in the presence of an acidic catalyst selected from the group consisting of sulfuric, phosphoric, p-toluenesulfonic and acetic acids and subsequently alkylating the bisphenol so formed with an olefin in the presence of a Friedel-Crafts alkylation catalyst and at a temperature between 20° C. and 120° C., the improvement of removing the water formed during said condensation reaction by an azeotropic distillation with said olefin, condensing the azeotrope, separating the olefin from the condensed azeotrope, and using the separated olefin to alkylate the bisphenol.

2. The process of preparing alkylated bisphenols which comprises condensing an aldehyde containing from 1 to 9 carbon atoms with a phenol taken from the class consisting of phenol and alkylated phenols containing not more than two alkyl substituents in said phenol nucleus and said alkyl substituents totaling not more than three carbon atoms, said condensation between said aldehyde and said phenol occurring at a temperature between 20° and 100° C. and in the presence of an acidic catalyst selected from the group consisting of sulfuric, phosphoric, p-toluenesulfonic and acetic acids, removing the water of condensation by distilling an azeotrope of said water with a liquid olefinic hydrocarbon containing between about 5 and about 9 carbon atoms, condensing the azeotrope, separating the olefin from the condensed azeotrope, and alkylating said bisphenol with said separated olefinic hydrocarbon in the presence of a Friedel-Crafts alkylation catalyst and at a temperature between 20° and 120° C.

3. The process of claim 2 wherein one mole of isobutyraldehyde is reacted with two moles of phenol and the product alkylated with diisobutylene.

4. The process of preparing alkylated bisphenols which comprises condensing a monofunctional aldehyde containing from 1 to 9 carbon atoms with a phenol taken from the class consisting of phenol and alkylated phenols containing not more than two alkyl substituents in said phenol nucleus and said alkyl substituents totaling not more than three carbon atoms by effecting said condensation at a temperature between 20° C. and 100° C. in the presence of an acidic type catalyst selected from the group consisting of sulfuric, phosphoric, p-toluenesulfonic and acetic acids and at a molar ratio of aldehyde to phenol from about 0.3 to about 1.5, removing the water of condensation by distilling an azeotrope of said water with a liquid olefinic hydrocarbon containing between about 5 and about 9 carbon atoms, and condensing the azeotrope, separating the olefin from the condensed azeotrope, and alkylating said bisphenol with said separated olefinic hydrocarbon in the presence of a Friedel-Crafts alkylation catalyst and at a temperature between 20° C. and 120° C.

5. The process of claim 4 wherein one mole of isobutyraldehyde is reacted with two moles of phenol and the product alkylated with diisobutylene.

References Cited by the Examiner

UNITED STATES PATENTS 2,734,088  2/56  Knowles et al. _____ 260—619
2,802,884  8/57  D'Alelio _____ 260—619

OTHER REFERENCES

Weissberger: "Technique of Organic Chemistry," vol. IV, page 363 (1951).

LEON ZITVER, *Primary Examiner.*

CHARLES B. PARKER, *Examiner.*